US011223666B2

(12) United States Patent
Ravishankar et al.

(10) Patent No.: US 11,223,666 B2
(45) Date of Patent: Jan. 11, 2022

(54) METHOD AND SYSTEM OF PROVIDING SECOND GENERATION (2G) VOICE SERVICES OVER INTERNET PROTOCOL

(71) Applicants: Channasandra Ravishankar, Germantown, MD (US); Gaguk Zakaria, Germantown, MD (US)

(72) Inventors: Channasandra Ravishankar, Germantown, MD (US); Gaguk Zakaria, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 121 days.

(21) Appl. No.: 16/694,106

(22) Filed: Nov. 25, 2019

(65) Prior Publication Data
US 2020/0322409 A1 Oct. 8, 2020

Related U.S. Application Data

(60) Provisional application No. 62/831,049, filed on Apr. 8, 2019.

(51) Int. Cl.
*H04L 29/06* (2006.01)
*H04W 84/06* (2009.01)
(Continued)

(52) U.S. Cl.
CPC ........ *H04L 65/605* (2013.01); *H04L 65/1026* (2013.01); *H04L 65/1069* (2013.01);
(Continued)

(58) Field of Classification Search
CPC ............... H04L 65/605; H04L 65/1026; H04L 65/1069; H04L 12/1818; H04L 12/66;
(Continued)

(56) References Cited

U.S. PATENT DOCUMENTS

| 6,987,985 | B2 * | 1/2006 | Purkayastha | ..... H04W 36/0066 |
| | | | | 455/552.1 |
| 8,200,240 | B1 * | 6/2012 | Qu | .......... H04W 4/20 |
| | | | | 455/456.1 |

(Continued)

FOREIGN PATENT DOCUMENTS

WO 2008087521 A1 7/2008

OTHER PUBLICATIONS

Search report for Great Britain patent application No. GB2005243.7 dated Dec. 4, 2020.

*Primary Examiner* — Jenee Holland
(74) *Attorney, Agent, or Firm* — Capitol City Techlaw; Jasbir Singh

(57) ABSTRACT

A system to provide second generation (2G) voice services over internet protocol, the system including: a voice gateway (VGW) including a 2G stack to communicate control plane information and user plane information with a 2G user terminal (UT) via a circuit-switched network without modifications to the 2G-UT, an Iu-CS IP stack, and a relay to map the control plane information between the 2G stack and the Iu-CS IP stack, and vice-versa; a mobile switching center (MSC), connected to the VGW via the Iu-CS IP stack, to manage and establish the voice services between the 2G-UT and a public switched telephone network (PSTN) based on the mapped control plane information; and a media gateway (MGW) connected to the VGW via the Iu-CS IP stack, where the MGW communicates the user plane information between the 2G-UT and the PSTN after the MSC 2-G UT vocoder, e.g. AMBE, has established voice services.

15 Claims, 3 Drawing Sheets

(51) Int. Cl.
*H04W 88/16* (2009.01)
*H04W 92/14* (2009.01)
*H04W 92/06* (2009.01)
*H04W 92/02* (2009.01)
*H04L 12/66* (2006.01)

(52) U.S. Cl.
CPC ............ *H04W 84/06* (2013.01); *H04W 88/16* (2013.01); *H04W 92/14* (2013.01)

(58) Field of Classification Search
CPC ...... H04L 47/70; H04W 84/06; H04W 88/16; H04W 92/14; H04W 92/02
See application file for complete search history.

(56) References Cited

U.S. PATENT DOCUMENTS

| | | | | |
|---|---|---|---|---|
| 2003/0026245 A1* | 2/2003 | Ejak | H04W 76/12 | 370/352 |
| 2003/0027569 A1* | 2/2003 | Ejak | H04L 65/1006 | 455/432.1 |
| 2003/0064725 A1* | 4/2003 | Niska | H04W 88/16 | 455/445 |
| 2003/0086418 A1* | 5/2003 | McIntosh | H04M 15/55 | 370/356 |
| 2003/0134650 A1* | 7/2003 | Sundar | H04L 69/08 | 455/465 |
| 2003/0139180 A1* | 7/2003 | McIntosh | H04W 12/062 | 455/426.1 |
| 2003/0185177 A1* | 10/2003 | Chitrapu | H04L 12/5692 | 370/335 |
| 2004/0010609 A1* | 1/2004 | Vilander | H04W 92/04 | 709/230 |
| 2004/0082366 A1* | 4/2004 | Longoni | H04Q 3/0016 | 455/561 |
| 2004/0203640 A1* | 10/2004 | Molander | H04W 76/12 | 455/414.1 |
| 2005/0078703 A1* | 4/2005 | Kim | H04W 88/16 | 370/466 |
| 2005/0221819 A1* | 10/2005 | Patel | H04W 76/40 | 455/432.1 |
| 2006/0003775 A1* | 1/2006 | Bull | H04W 4/025 | 455/456.1 |
| 2006/0111134 A1* | 5/2006 | Mills | H04W 76/45 | 455/518 |
| 2007/0041360 A1* | 2/2007 | Gallagher | H04W 88/12 | 370/352 |
| 2008/0039087 A1* | 2/2008 | Gallagher | H04W 8/04 | 455/435.2 |
| 2008/0076392 A1* | 3/2008 | Khetawat | H04L 63/123 | 455/411 |
| 2008/0132224 A1* | 6/2008 | Gallagher | H04W 8/04 | 455/422.1 |
| 2008/0146208 A1* | 6/2008 | Ejak | H04L 65/1043 | 455/416 |
| 2008/0198874 A1* | 8/2008 | Matsushima | H04L 65/103 | 370/466 |
| 2008/0310404 A1* | 12/2008 | Valme | H04M 7/006 | 370/353 |
| 2009/0059848 A1* | 3/2009 | Khetawat | H04L 61/2514 | 370/328 |
| 2009/0135795 A1* | 5/2009 | Lim | H04L 65/1026 | 370/338 |
| 2009/0190550 A1* | 7/2009 | Giustina | H04L 63/0471 | 370/331 |
| 2009/0196233 A1* | 8/2009 | Zhu | H04W 92/04 | 370/328 |
| 2010/0041405 A1* | 2/2010 | Gallagher | H04W 8/02 | 455/436 |
| 2010/0097990 A1* | 4/2010 | Hallenstal | H04W 80/04 | 370/328 |
| 2010/0315995 A1* | 12/2010 | Bloomfield | H04L 65/80 | 370/328 |
| 2011/0103303 A1* | 5/2011 | Hsu | H04W 76/12 | 370/328 |
| 2011/0249654 A1* | 10/2011 | Yu | H04W 60/04 | 370/331 |
| 2011/0261683 A1* | 10/2011 | Nitta | H04W 76/20 | 370/225 |
| 2011/0275362 A1* | 11/2011 | Nitta | H04W 76/20 | 455/422.1 |
| 2011/0287785 A1* | 11/2011 | Hu | H04W 8/08 | 455/456.2 |
| 2012/0039191 A1* | 2/2012 | Foster | H04W 24/08 | 370/252 |
| 2012/0224528 A1 | 9/2012 | Tapia et al. | | |
| 2017/0295522 A1* | 10/2017 | Shalev | H04W 36/0022 | |

\* cited by examiner

METHOD AND SYSTEM OF PROVIDING SECOND GENERATION (2G) VOICE SERVICES OVER INTERNET PROTOCOL

CROSS-REFERENCE TO RELATED APPLICATIONS AND INCORPORATION BY REFERENCE

The present application claims the benefit under 35 U.S.C. 119(e) of U.S. Provisional Application Ser. No. 62/831,049, filed Apr. 8, 2019, which is incorporated herein by reference in its entirety.

FIELD

A system and method to provide second generation (2G) services over Internet protocol, in particular, Iu-CS over IP, is disclosed. By providing 2G services over IP resources a need for dedicated circuits for each voice connection can be greatly reduced or eliminated. The present teachings may be implemented in a 2G compliant voice gateway without amending or changing a user terminal providing one endpoint of a 2G voice service and a Public Switched Telephone Network (PSTN) on the other end of the 2G voice service; in essence, converting the voice services from the 2G voice gateway to the PSTN into a Voice Over IP (VoIP) implementation.

BACKGROUND

In the prior art, THURAYA is a mobile-satellite service (MSS) provider that uses 2G compliant user terminals (UTs) to provide voice services via a satellite. A THURAYA user terminal connects to a 2G voice gateway using a GMR-1 air interface. The 2G voice gateway's control plane connects to a Mobile Switching Center (MSC) using the "A interface" over a Circuit-Switched (CS) network, while the gateway's data plane connects to the MSC using an E1 frame interface over a second CS network. Lastly, the MSC connects to a Public Switched Telephone Network (PSTN) via another CS connection. The GMR-1 air interface, the A interface, and the E1 frame are CS networks, with each interface needing a dedicated network, i.e., three CS networks are needed to provide voice services from a UT to the MSC. As such, providing voice services for each 2G-UT connected to the 2G gateway is very resource intensive, as each 2G gateway supports more 2G-UTs than the number of CS networks available to the 2G gateway.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings replace the control plane and data plane interfaces of the prior art (i.e., the A interface and the E1 frame) with a packet-switched control and user plane information exchange. The packet-switched control and user plane information exchange uses a shared packet-switched network to provide voice services to multiple UTs to a Public Switched Telephone Network (PSTN). An exemplary packet-switched control and plane interface is Iu-CS over IP. Iu-CS over IP does not use three dedicated CS networks, but rather uses one shared packet-switched network to provide voice services for each UT obtaining voice services from the 2G gateway.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system to provide second generation (2G) voice services over internet protocol, the system including: a voice gateway (VGW) including a 2G stack to communicate control plane information and user plane information with a 2G user terminal (UT) via a circuit-switched network without modifications to the 2G-UT, an Iu-CS IP stack, and a relay to map the control plane information between the 2G stack and the Iu-CS IP stack, and vice-versa; a mobile switching center (MSC), connected to the VGW via the Iu-CS IP stack, to manage and establish the voice services between the 2G-UT and a public switched telephone network (PSTN) based on the mapped control plane information; and a media gateway (MGW) connected to the VGW via the Iu-CS IP stack, where the MGW communicates the user plane information between the 2G-UT and the PSTN after the MSC has established voice services. Other embodiments of this aspect include corresponding computer systems, apparatus, and computer programs recorded on one or more computer storage devices, each configured to perform the actions of the methods.

Implementations may include one or more of the following features. The system where the 2G-UT and the VGW communicate over a satellite link. The system where the 2G-UT includes a Thuraya UT. The system where the MSC communicates with the MGW to establish a bearer between the VGW and the PSTN. The system where the relay maps a base station system application part (BSSAP) message of the 2G stack to a radio access network application part (RANAP) message of the Iu-CS IP stack. The system where the VGW further includes a vocoder to convert voice from the 2G-UT to a pulse code modulation (pcm) 64 k format. The system where the VGW further includes a vocoder to convert voice from the PSTN to an advanced multiband excitation (AMBE) format. Implementations of the described techniques may include hardware, a method or process, or computer software on a computer-accessible medium.

One general aspect includes a voice gateway (VGW) to provide voice services to a 2G terminal over IP including: a 2G stack to communicate control plane information and user plane information with a 2G user terminal (ut) via a circuit-switched network without modifications to the 2G-UT; an Iu-CS IP stack to connect the VGW with a mobile switching center (MSC) that manages and establishes the voice services between the 2G-UT and a public switched telephone network (PSTN), and to connect the VGW with a media gateway (MGW), where the MGW communicates the user plane information between the 2G-UT and the PSTN after the MSC has established the voice services; and a relay to map the control plane information between the 2G stack and the Iu-CS IP stack, and vice-versa, where the MSC uses the mapped control plane information, and where the MGW communicates the user plane information between the 2G-UT and the PSTN after the MSC has established voice services. Other embodiments of this aspect include corresponding computer systems, apparatus, and computer programs recorded on one or more computer storage devices, each configured to perform the actions of the methods.

One general aspect includes a non-transient computer-readable storage medium having instructions embodied thereon, the instructions being executable by one or more processors to perform a method for providing voice services over internet protocol to a second generation (2G) user terminal (UT), the method including: communicating control plane information and user plane information with the 2G-UT via a circuit-switched network without modifications to the 2G-UT; mapping the control plane information between the 2G-UT and a mobile switching center (MSC), and vice-versa; managing the voice services facilitated by the MSC between the 2G-UT and a public switched telephone network (PSTN) based on the mapped control plane information over a packet-switched network; establishing a bearer to transport the user plane information between the 2G-UT and the PSTN; and transporting the user plane information between the 2G-UT and the PSTN after the establishing over the packet-switched network. Other embodiments of this aspect include corresponding computer systems, apparatus, and computer programs recorded on one or more computer storage devices, each configured to perform the actions of the methods.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1:
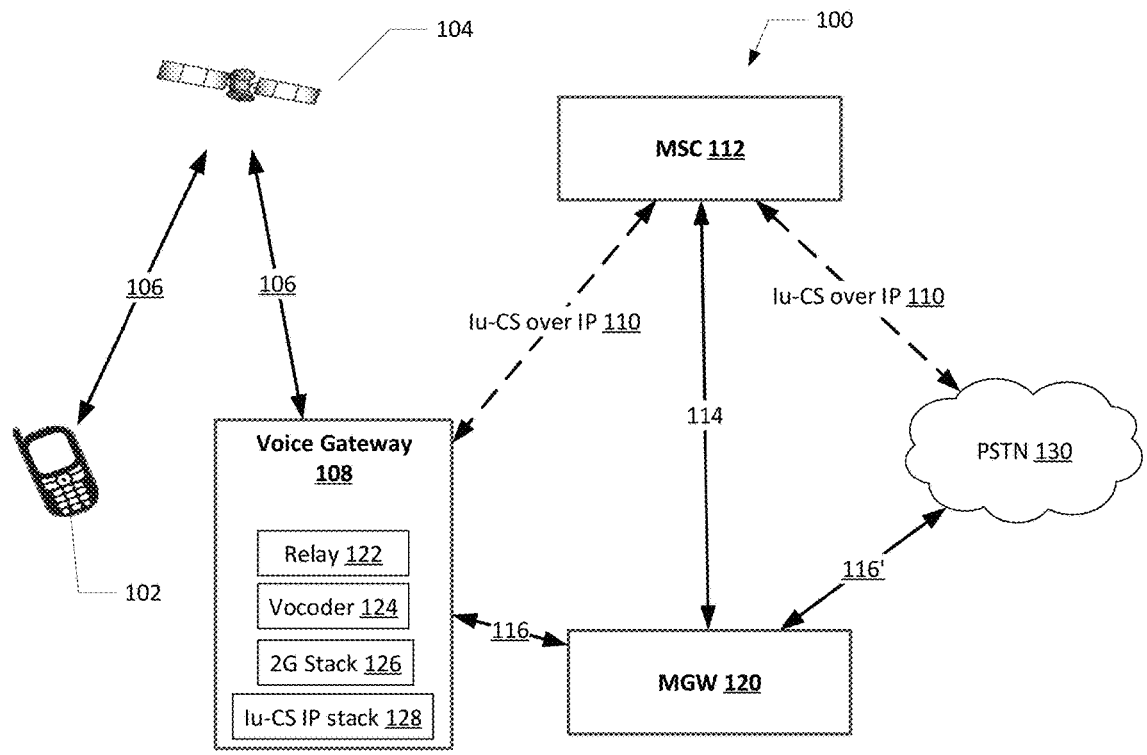
FIG. 1 illustrates a system to provide 2G services over IP according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings are directed to aggregating Representational State Transfer (REST) API response fields for a high-latency network, such as, a high-latency network including a satellite link.

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

The present teachings replace the control plane and data plane interfaces of the prior art (i.e., the A interface and the E1 frame) with a packet-switched control and plane interface. The packet-switched control and plane interface uses a shared packet-switched network to provide voice services to multiple UTs to a Public Switched Telephone Network (PSTN).

An exemplary packet-switched control and plane interface is Iu-CS over IP. An Iu-CS Interface (Circuit Switched) is an interface in UMTS which links a Radio Network Controller (RNC) with a 3G Mobile Switching Centre (3G MSC). In some embodiments, the Iu-CS interface may be implemented over Internet Protocol (IP) and may be referred to as Iu-CS over IP. Iu-CS over IP does not use dedicated CS network components, but rather uses one shared packet-switched network to provide voice services for each UT obtaining voice services from the 2G gateway. Iu-CS over IP allows for using an IP based interface for Core Network (CN) implementations. In some embodiments, no modifications are made to the 2G legacy user terminals (UTs), for example, the 2G legacy THURAYA UTs.

FIG. 1 illustrates a system to provide 2G services over IP according to various embodiments.

A system 100 to provide legacy voice services over IP may include a 2G-UT 102 requesting voice services from a PSTN 130. The voice services are provided by a voice gateway 108 connected to the 2G-UT 102 via a satellite 104 using a 2G stack (see FIG. 2) over interface 106. The VGW 108 may include a relay 122, a vocoder 124, a 2G stack 126, and an Iu-CS IP stack 128.

In exemplary embodiments, the 2G-UT 102 may be a 2G-UT that is 2G compliant or 2G compliant with minor modifications (for example, a 2G-UT with Thuraya modifications). The interface 106 may include a GMR-1 air interface for the user plane.

The voice gateway 108 may connect to an MSC 112 over an Iu-CS over IP interface 110. The voice gateway 108 may connect to a Media Gateway (MGW) 120 via a packet-switched network 116. Control plane information, between the 2G-UT 102 and the PSTN 130, may be exchanged through the MSC 112 via the Iu-CS over IP interface 110. The Iu-CS over IP interface 110 replaces an A interface between the VGW 108 and the MSC 112. The relay 122 provides mapping between the 2G control information (for example, a Base Station System Application Part (BSSAP) message) to a 3G control information, (for example, a RANAP messages). The relay 122 ensures that the 2G control information sent to and received from the MSC 120 is not different from the 2G control information. In some embodiments, the content of the 3G messages (for example, RANAP messages is the same as the content of the BSSAP messages to ensure compatibility with the 2G-UT 102, for example, a THURAYA voice terminal.

Control plane information between the MSC 112 and the MGW 120 may be exchanged through via a control interface 114 using an industry standard protocol, for example, the H.248/MEGACO protocol. In some embodiments the control interface 114 may be an IP network. The control interface 114 and the packet-switched network 116 may use the same transport (link). In some embodiments, the control interface 114 may use a media Gateway control protocol such as H.248 or MEGACO in order to provide telecommunication services across a converged internetwork consisting of a traditional PSTN and modern packet networks, such as the Internet.

When the MSC 112 is establishing the voice services, the MSC 112 instructs the MGW 120 via the control interface 114 to establish a connection via the packet-switched network 116 to the VGW 108. The MSC 112 also instructs the MGW 120 to establish a connection via a control interface 116' to the PSTN 130. User plane information, between the 2G-UT 102 and the PSTN 130, may be exchanged through the MGW 120 via the packet-switched network 116 and the control interface 116'. The 64 k PCM may be carried as the payload of the RTP/UDP/IP packet. In various embodiments, the packet may be a Real-time Transport Protocol (RTP) packet. RTP packets are usually conveyed using User Datagram Protocol (UDP) over IP. 116' is circuit switched network, NOT packet-switched network.

MGW 120 is a translator device that converts IP packets from the VGW 108 to circuit-switched TDM towards the PSTN 130, and converts circuit-switched TDM from the PSTN 130 to IP packets towards the VGW 108.

In some embodiments, user plane information (for example, voice) traverses between the VGW 108 and MGW 120 in 64 k PCM as a packet payload via the packet-switched network 116. When the 2G-UT 102 and the PSTN 130 use dissimilar voice encoding, the vocoder 124 may convert between the dissimilar voice encodings, for example, Advanced Multiband Excitation (AMBE), AMBE+ or AMBE+2 encoding from the 2G-UT 102 may be translated to and from 64 k PCM. The vocoder 124 may be a commercial off the shelf product. In some embodiments, user plane voice traverses between the VGW 108 and MGW 120 in 64 k PCM. In some embodiments, the VGW 108 converts the AMBE+ voice into 64 kbps PCM on the uplink (from the 2G-UT 102) and from 64 kbps PCM to AMBE+ on the downlink (to the 2G-UT 102) with the vocoder 124.

The 2G stack 126 may be a standard commercial off-the-shelf product. The Iu-CS IP stack 128 may be a standard commercial officer shall product.

Figure 2:
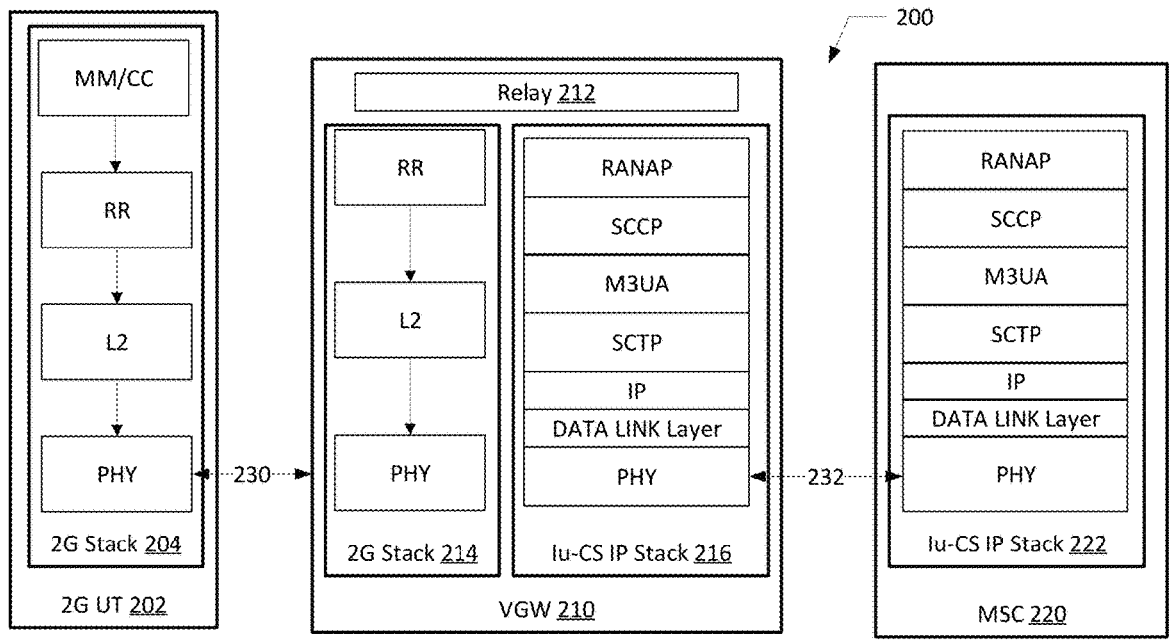
FIG. 2 illustrates a system to provide 2G services over IP according to various embodiments.

FIG. 2 illustrates a system to provide 2G services over IP according to various embodiments.

A system 200 to provide 2G voice services over IP may include a 2G-UT 202, a VGW 210 and an MSC 220. The 2G-UT 202 may include a 2G stack 204 to provide voice services over a circuit-switched network 230. The 2G stack 204 may communicate with a peer stack, for example, a 2G stack 214 included in the VGW 210.

The VGW 210 may include a relay 212 and an Iu-CS IP stack 216. The relay 212 maps control plane information from the 2G stack 214 and manages the voice service requests from both the 2G-UT 202 or the MSC 220. The relay 212 routes user plane information from the 2G-UT 202, and received via a circuit setup by the 2G stack's 204 and 214, to an associated bearer assigned by the MSC 220. The relay 212 routes user plane information from a PSTN (not shown), and received via a bearer setup by the MSC 220, to an associated circuit setup by the 2G stacks 214 and 204. The Iu-CS IP 216 may interface with an Iu-CS IP stack 222 included in the MSC 220. The communications between the MSC 220 and the VGW may be provided a packet-switched network 232.

An exemplary 2G stack 204 provides communications via an GMR-1 air interface in conjunction with a GSM 04.08 interface. An exemplary Iu-CS IP stack may transport RANAP messages in the control plane. In telecommunications networks, RANAP is a protocol specified by 3GPP in TS 25.413 for signaling between the Core Network component such as a MSC and the UTRAN. RANAP is carried over the Iu-interface. Some prior art systems may use BSSAP messages. BSSAP is a GSM-specific protocol designed for signaling over the A interface. In some embodiments, when BSSAP is replaced by RANAP in the control plane, the relay 212 may set the content of the RANAP messages same as the content of the legacy BSSAP messages to ensure compatibility with a 2G-UT, for example, the legacy THURAYA voice terminal.

Figure 3:
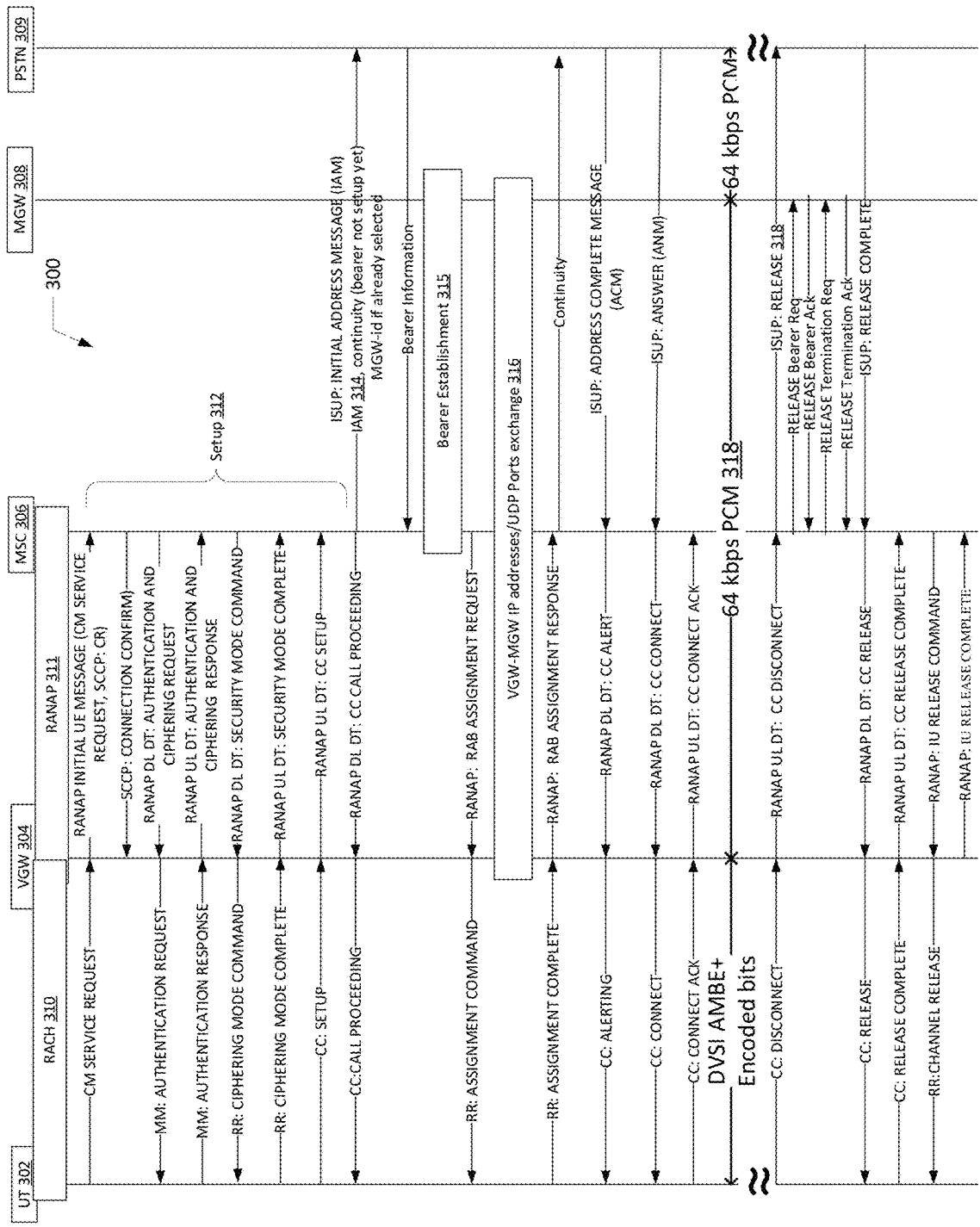
FIG. 3 illustrates a signal flow to establish a voice call over IP according to various embodiments.

FIG. 3 illustrates a signal flow to establish a voice call according to various embodiments.

A call flow 300 may establish a voice call between a UT 302 and a PSTN 309 using a VGW 304, an MGW 306, and an MGW 308. Communications between the UT 302 and the VGW 304 may use a RACH (Random Access Channel) protocol 310 as an initial message to setup a connection with the VGW 304. Communications between the VGW 304 and the MSC 306 may use a RANAP protocol 311. To initiate voice services, the UT 302 and VGW 304 may perform a call setup 312. After call setup 312, bearer establishment 314 may be performed to establish two packet circuits namely, one between the VGW 304 and the MGW 308, and one between the MGW 308 and the PSTN 309 as discussed above. The MSC 306 will configure the voice services of the MGW 308 to the PSTN 309 and vice versa.

The MSC 306 starts communicating with the PSTN 309 by sending the ISUP: INITIAL Address Message (IAM) at 315 resulting in a bearer establishment 315. After the bearer establishment 315, the VGW 304 and MGW 308 exchange IP addresses and UDP ports at 316. Bearer tear down procedures start when the MSC sends ISUP: Release 318 to the PSTN 309. User plane information such as voice in 64 kbps PCM format may bypass the MSC 304 and be directly transferred between the VGW 304 and the MGW 308, and onto the PSTN 309 thereafter. User plane information (voice) between the 2G-UT 302 may be exchanged in a vocoder format suitable for transfer over radio links, for example, DVSI AMBI+. The VGW 304 converts the voice between the format expected by the UT 302 and the PSTN 309 as necessary.

Figure 4:
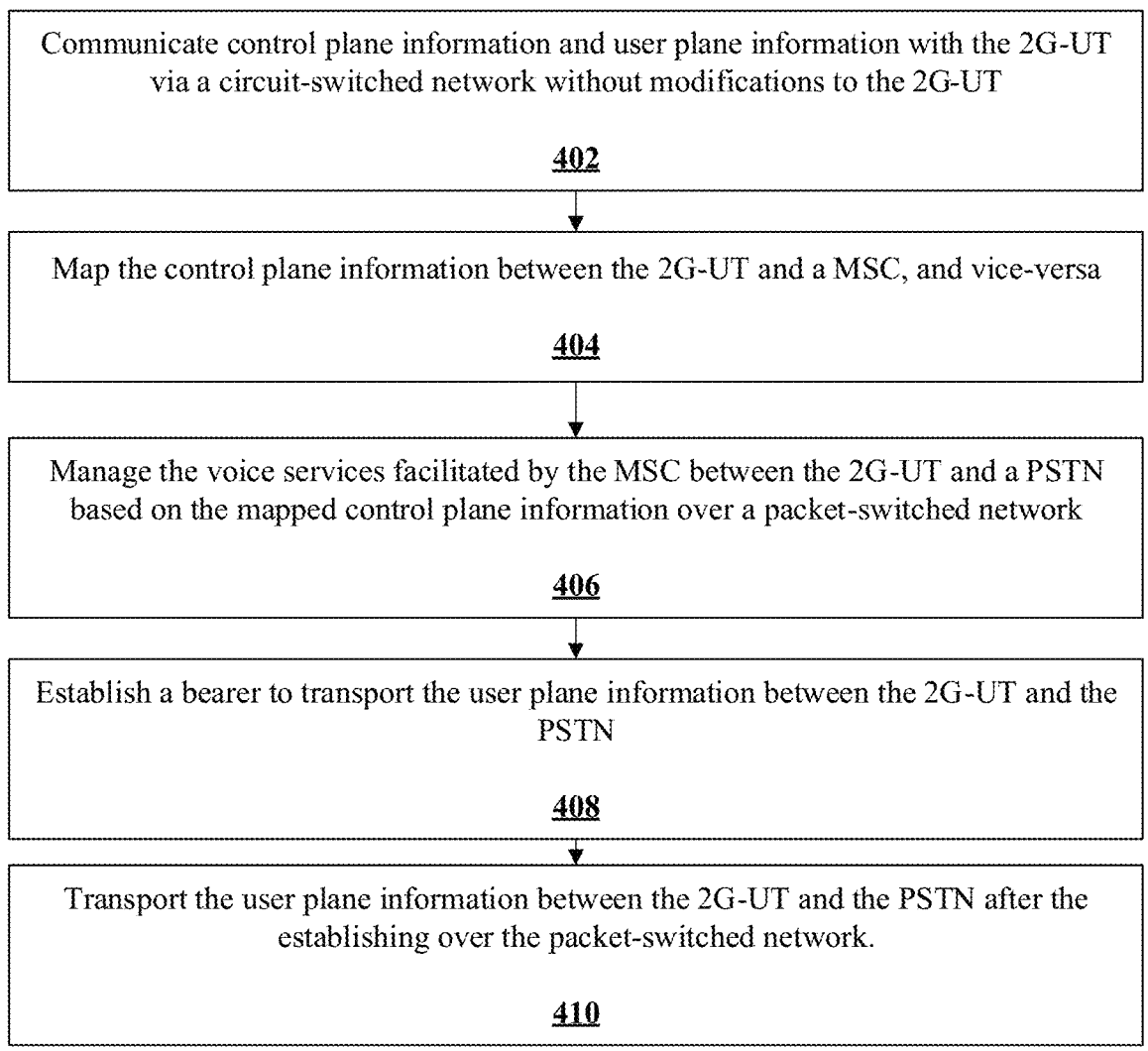
FIG. 4 illustrates a method for providing voice services according to various embodiments.

FIG. 4 illustrates a method for providing voice services according to various embodiments.

A method 400 to provide voice services to a 2G-UT may include operation 402 to communicate control plane information and user plane information with the 2G-UT via a circuit-switched network without modifications to the 2G-UT. Method 400 may further include operation 404 to map the control plane information between the 2G-UT and a Mobile Switching Center (MSC), and vice-versa. Method 400 may include operation 406 to manage the voice services facilitated by the MSC between the 2G-UT and a Public Switched Telephone Network (PSTN) based on the mapped control plane information over a packet-switched network. Method 400 may include operation 408 to establish a bearer to transport the user plane information between the 2G-UT and the PSTN. Method 400 may include operation 410 to transport the user plane information between the 2G-UT and the PSTN after the establishing over the packet-switched network.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim as our invention:

1. A system to provide Second Generation (2G) voice services over Internet Protocol, the system comprising:
   a voice gateway (VGW) comprising:
      a 2G stack to communicate control plane information and user plane information with a 2G User Terminal (UT) via a circuit-switched network without modifications to the 2G-UT,
      an Iu-CS IP stack, and
      a relay to map the control plane information between the 2G stack and the Iu-CS IP stack, and vice-versa;
   a Mobile Switching Center (MSC), connected to the VGW via the Iu-CS IP stack, to manage and establish the voice services between the 2G-UT and a Public Switched Telephone Network (PSTN) based on the mapped control plane information; and
   a Media Gateway (MGW) connected to the VGW via the Iu-CS IP stack, wherein the MGW communicates the user plane information between the 2G-UT and the PSTN after the MSC has established voice services.

2. The system of claim 1, wherein the 2G-UT and the VGW communicate over a satellite link.

3. The system of claim 1, wherein the 2G-UT comprises a THURAYA UT.

4. The system of claim 1, wherein the MSC communicates with the MGW to establish a bearer between the VGW and the PSTN.

5. The system of claim 1, wherein the relay conveys a Base Station System Application Part (BSSAP) message of the 2G stack to a Radio Access Network Application Part (RANAP) message of the Iu-CS IP stack.

6. The system of claim 1, wherein the VGW further comprises a vocoder to convert voice from a 2G-UT vocoder format to a Pulse Code Modulation (PCM) 64 k format.

7. The system of claim 1, wherein the VGW further comprises a vocoder to convert voice from a PSTN vocoder format to a 2G-UT vocoder format comprising an Advanced Multiband Excitation (AMBE) format.

8. A voice gateway (VGW) to provide voice services to a 2G terminal over IP comprising:
   a 2G stack to communicate control plane information and user plane information with a 2G User Terminal (UT) via a circuit-switched network without modifications to the 2G-UT;
   an Iu-CS IP stack to connect the VGW with a Mobile Switching Center (MSC) that manages and establishes the voice services between the 2G-UT and a Public Switched Telephone Network (PSTN), and to connect the VGW with a Media Gateway (MGW), wherein the MGW communicates the user plane information between the 2G-UT and the PSTN after the MSC has established the voice services; and
   a relay to map the control plane information between the 2G stack and the Iu-CS IP stack, and vice-versa, wherein the MSC uses the mapped control plane information, and wherein the MGW communicates the user plane information between the 2G-UT and the PSTN after the MSC has established voice services.

9. The VGW of claim 8, wherein the 2G-UT and the VGW communicate over a satellite link.

10. The VGW of claim 8, wherein the 2G-UT comprises a THURAYA UT.

11. The VGW of claim 8, wherein the MSC communicates with the MGW to establish a bearer between the VGW and the PSTN.

12. The VGW of claim 8, wherein the relay maps a Base Station System Application Part (BSSAP) of the 2G stack to a Radio Access Network Application Part (RANAP) message of the Iu-CS IP stack.

13. The VGW of claim 8, wherein the VGW further comprises a vocoder to convert voice from a 2G-UT vocoder format to a Pulse Code Modulation (PCM) 64 k format.

14. The VGW of claim 8, wherein the VGW further comprises a vocoder to convert voice from a PSTN vocoder format to a 2G-UT vocoder format comprising an Advanced Multiband Excitation (AMBE) format.

15. A non-transient computer-readable storage medium having instructions embodied thereon, the instructions being executable by one or more processors to perform a method for providing voice services over Internet Protocol to a Second Generation (2G) User Terminal (UT), the method comprising:
   communicating, via a 2G stack, control plane information and user plane information with the 2G-UT via a circuit-switched network without modifications to the 2G-UT;
   mapping the control plane information between the 2G-UT and a Mobile Switching Center (MSC), and vice-versa;
   managing, via an Interface-Circuit Switched (Iu-CS) Internet Protocol (IP) stack, the voice services facilitated by the MSC between the 2G-UT and a Public Switched Telephone Network (PSTN) based on the mapped control plane information over a packet-switched network;
   establishing, via the Iu-CS stack, a bearer to transport the user plane information between the 2G-UT and the PSTN;
   connecting the VGW with a Media Gateway (MGW), wherein the MGW communicates the user plane information between the 2G-UT and the PSTN after the establishing; and
   transporting the user plane information between the 2G-UT and the PSTN after the establishing over the packet-switched network.

* * * * *